US009268542B1

(12) United States Patent
Mars et al.

(10) Patent No.: US 9,268,542 B1
(45) Date of Patent: Feb. 23, 2016

(54) CACHE CONTENTION MANAGEMENT ON A MULTICORE PROCESSOR BASED ON THE DEGREE OF CONTENTION EXCEEDING A THRESHOLD

(75) Inventors: Jason Mars, Charlottesville, VA (US); Robert Hundt, Palo Alto, CA (US); Neil A. Vachharajani, San Francisco, CA (US)

(73) Assignee: Google Inc., Mountain View, CA (US)

( * ) Notice: Subject to any disclaimer, the term of this patent is extended or adjusted under 35 U.S.C. 154(b) by 348 days.

(21) Appl. No.: 13/096,821

(22) Filed: Apr. 28, 2011

(51) Int. Cl.
| G06F 9/46 | (2006.01) |
| G06F 13/00 | (2006.01) |
| G06F 9/45 | (2006.01) |
| G06F 9/30 | (2006.01) |
| G06F 9/52 | (2006.01) |
| G06F 13/372 | (2006.01) |
| G06F 13/30 | (2006.01) |

(52) U.S. Cl.
CPC ................ *G06F 8/4442* (2013.01); *G06F 9/30* (2013.01); *G06F 9/46* (2013.01); *G06F 9/526* (2013.01); *G06F 13/30* (2013.01); *G06F 13/372* (2013.01)

(58) Field of Classification Search
CPC ... G06F 8/4442; G06F 2205/123; G06F 9/30; G06F 9/46; G06F 9/52; G06F 9/526; G06F 13/14; G06F 13/28; G06F 13/26; G06F 13/285; G06F 13/30; G06F 13/372
USPC .......... 718/102, 104, 103; 711/118, 141, 130, 711/E12.045, E12.052, 167
See application file for complete search history.

(56) References Cited

U.S. PATENT DOCUMENTS

| 7,457,931 B1* | 11/2008 | Fedorova ........................ 711/167 |
| 7,596,683 B2* | 9/2009 | Morrow ......................... 712/228 |
| 8,006,244 B2* | 8/2011 | Davis et al. .................... 718/100 |
| 2004/0064645 A1* | 4/2004 | Buzby et al. ................... 711/121 |
| 2007/0067578 A1* | 3/2007 | Kurichiyath ................... 711/141 |
| 2007/0101067 A1* | 5/2007 | Shafi .................... G06F 12/0817 711/141 |
| 2009/0222625 A1* | 9/2009 | Ghosh et al. ................... 711/130 |
| 2010/0070730 A1* | 3/2010 | Pop ........................ G06F 8/4442 711/167 |
| 2010/0095300 A1* | 4/2010 | West et al. ..................... 718/104 |
| 2010/0205602 A1* | 8/2010 | Zedlewski et al. ................ 718/1 |
| 2011/0055479 A1* | 3/2011 | West et al. ..................... 711/118 |

(Continued)

OTHER PUBLICATIONS

Xu et al., Cache Contention and Application Performance Prediction for Multi-Core Systems,2010, ISPASS, IEEE, pp. 76-86.*

(Continued)

*Primary Examiner* — Meng An
*Assistant Examiner* — Abu Ghaffari
(74) *Attorney, Agent, or Firm* — Fish & Richardson P.C.

(57) ABSTRACT

A first indicator of a first number of cache misses to a cache memory of a multicore processor for a first application over a first time period is received. The first application executes on a first core of the processor and a second application simultaneously executes on a second core of the processor during the first time period. The first and second cores share the cache memory. A second indicator of a second number of cache misses to the cache memory for the first application over a second time period is received. During the second time period, the first application executes on the first core and the second application does not execute on the second core. A degree of contention among the first and second applications is determined based on the first and second indicators, and execution of the second application is adjusted based on the determined degree of contention.

17 Claims, 11 Drawing Sheets

(56) References Cited

U.S. PATENT DOCUMENTS

| | | | |
|---|---|---|---|
| 2011/0209154 A1* | 8/2011 | Gooding et al. | 718/103 |
| 2011/0246995 A1* | 10/2011 | Fedorova et al. | 718/103 |
| 2011/0302372 A1* | 12/2011 | Fontenot et al. | 711/122 |

OTHER PUBLICATIONS

Sandberg et al., Reducing Cache Pollution Through Detection and Elimination of Non-Temporal memory Accesses, 2010, International conference for digital object identifier, pp. 1-11.*
Blelloch and Gibbons. "Effectively sharing a cache among threads:" in *SPAA '04: Proceedings of the Sixteenth Annual ACM Symposium on Parallelism in Algorithms and Architectures.* New York, New York, ACM, 2004, pp. 235-244.
Chandra et al. "Predicting interthread cache contention on a chip multi-processor architecture:" in *HPCA '05: Proceedings of the 11th International Symposium on High-Performance Computer Architecture.* Washington, DC, IEEE Computer Society, 2005, pp. 340-351.
Chang and Sohi. "Cooperative cache partitioning for chip multiprocessors:" in *ICS '07: Proceedings of the 21st Annual International Conference on Supercomputing.* New York, New York, ACM, 2007, pp. 242-252.
Chen at al. "Scheduling threads for constructive cache sharing on cmps:" in *SPAA '07: Proceedings of the Nineteenth Annual ACM Symposium on Parallel Algorithms and Architectures.* New York, New York, ACM, 2007, pp. 105-115.
Ding and Zhong. "Predicting whole-program locality through reuse distance analysis:" in *PLDI '03: Proceedings of the ACM SIG-PLAN 2003 Conference on Programming Language Design and Implementation.* New York, New York, ACM, 2003, pp. 245-257.
Fedorova et al. "Performance of multithreaded chip multiprocessors and implications for operating system design:" in *ATEC '05: Proceedings of the Annual Conference on USENIX Annual Technical Conference.* Berkeley, California, USENIX Association, 2005, 14 pages.
Herdrich et al. "Rate-based qos techniques for cache/memory in cmp platforms:" in *ICS '09: Proceedings of the 23rd International Conference on Super-computing.* New York, New York, ACM, 2009, pp. 479-488.
Huh et al. "A nuca substrate for flexible cmp cache sharing." *IEEE Transactions on Parallel and Distributed Systems*, 18(8), 2007, pp. 1028-1040.
Iyer, R. "Cqos: a framework for enabling qos in shared caches of cmp platforms:" *ICS '04: Proceedings of the 18th Annual International Conference on Supercomputing.* New York, New York, ACM, 2004, pp. 257-266.
Iyer et al. "Qos policies and architecture for cache/memory in cmp platforms:" in *SIGMETRICS '07: Proceedings of the 2007 ACM SIGMETRICS International Conference on Measurement and Modeling of Computer Systems.* New York, New York, ACM, 2007, pp. 25-36.
Jiang et al. "Analysis and approximation of optimal co-scheduling on chip multiprocessors:" in *PACT '08: Proceedings of the 17th International Conference on Parallel Archi-tectures and Compilation Techniques.* New York, New York, ACM, 2008, pp. 220-229.
Kim et al. "Fair cache sharing and partitioning in a chip multiprocessor architecture:" in *PACT '04: Proceedings of the 13th International Conference on Parallel Architectures and Compilation Techniques.* Washington, DC, IEEE Computer Society, 2004, pp. 111-122.
Knauerhase et al. "Using OS Observations to Improve Performance in Milticore Systems." *IEEE Micro*, 28 (3), 2008, pp. 54-66.
Mars and Hundt. "Scenario based optimization: A framework for statically enabling online optimizations:" in *CGO '09: Proceedings of the 2009 International Symposium on Code Generation and Optimization.* Washington, DC, IEEE Computer Society, 2009, pp. 169-179.
Moreto et al. "Flexdcp: a qos framework for cmp architectures." *SIGOPS Oper. Syst. Rev*, 43(2), 2009, pp. 86-95.
Nesbit et al. "Fair queuing memory systems:" in *MICRO 39: Proceedings of the 39th Annual IEEE/ACM International Symposium on Microarchitecture.* Washington, DC, IEEE Computer Society, 2006, 12 pages.
Nesbit et al. "Virtual private caches:" in *ISCA '07: Proceedings of the 34th Annual International Symposium on Computer Architecture.* New York, New York, ACM, 2007, pp. 57-68.
Rafique et al. "Architectural support for operating system-driven cmp cache management:" in *PACT '06: Proceedings of the 15th International Conference on Parallel Architectures and Compilation Techniques.* New York, New York, ACM, 2006, pp. 2-12.
Reddy and Petrov. "Eliminating inter-process cache interference through cache reconfigurability for real-time and low-power embedded multi-tasking systems:" in *CASES '07: Proceedings of the 2007 International Conference on Compilers, Architecture, and Synthesis for Embedded Systems.* New York, New York, ACM, 2007, pp. 198-207.
Soares et al. "Reducing the harmful effects of last-level cache polluters with an os-level, software-only pollute buffer:" in *MICRO '08: Proceedings of the 2008 41st IEEE/ACM International Symposium on Microarchitecture.* Washington, DC, IEEE Computer Society, 2008, pp. 258-269.
Suhendra and Mitra. "Exploring locking & partitioning for predictable shared caches on multi-cores:" in *DAC '08: Proceedings of the 45th Annual Design Automation Conference.* New York, New York, ACM, 2008, pp. 300-303.
Zhuravlev et al. "Addressing Shared Resource Contention in Multicore Processors via Scheduling:" in *ASPLOS '10.* Pittsburgh, Pennsylvania, ACM, 2010, pp. 129-141.

* cited by examiner

US 9,268,542 B1

CACHE CONTENTION MANAGEMENT ON A MULTICORE PROCESSOR BASED ON THE DEGREE OF CONTENTION EXCEEDING A THRESHOLD

TECHNICAL FIELD

This document relates to optimizing the performance of a multicore processor.

BACKGROUND

Multicore processor architectures are widely used in modern computing systems. These architectures dominate in many domains, including those with quality of service (QoS) and low latency requirements. A multicore processor architecture includes two or more processing cores, on which two or more software applications may execute in parallel. When two or more applications are executing in parallel on separate cores of a single multicore processor, the applications are said to be co-located on the processor.

The processing cores of the multicore processor often use both private resources and shared resources to perform tasks associated with the executing applications. Private resources are generally replicated across each of the processing cores, for exclusive use by a corresponding individual processing core. Shared resources, by contrast, may generally be used by any of the processing cores of the multicore processor. When two or more applications that are simultaneously executing on separate cores each attempt to use a shared resource, contention for the shared resource can result. Often, contention for shared resources can result in reduced performance, or cross-core application interference, for one or both of the applications competing for the shared resource.

SUMMARY

This document describes systems and techniques that may be used for detecting and responding to contention among two or more applications vying for shared resources in a multicore processor environment.

In a first general aspect, a computer-implemented method for contention handling includes receiving a first indicator of a first number of cache misses to a cache memory of a multicore processor for a first software application over a first time period. The first software application executes on a first core of the multicore processor and a second software application simultaneously executes on a second core of the multicore processor during the first time period. The first core and the second core share the cache memory of the multicore processor. The method also includes receiving a second indicator of a second number of cache misses to the cache memory of the multicore processor for the first software application over a second time period. The first software application executes on the first core during the second time period and the second software application does not execute on the second core during the second time period. The method further includes determining a degree of contention among the first software application and the second software application based on the first indicator and the second indicator, and adjusting execution of the second software application based on the determined degree of contention.

In various implementations, the adjusting execution of the second software application based on the determined degree of contention may include: (i) halting execution of the second software application on the second core for a first response period of time if the determined degree of contention exceeds a determined contention threshold, or (ii) enabling execution of the second software application on the second core for a second response period of time if the degree of contention does not exceed the determined contention threshold. The method may further include halting execution of the second software application on the second core for a time period longer than the first response period of time when successively measured degrees of contention between the first software application and the second software application exceed the determined contention threshold. Each of the first core and the second core may include a private cache memory, and the cache memory of the multicore processor that is shared by the first core and the second core may include a last level cache for the first core and the second core. Receiving the first indicator may include reading from a memory location that is accessible by the first core and the second core, and receiving the second indicator may include reading a performance counter that is associated with the second core. The first time period and the second time period may occur during a single execution of the first software application. The degree of contention may be determined during the single execution of the first software application. The first software application may be more sensitive to latency than is the second software application. The method may also include detecting contention among the first software application and the second software application for another shared resource of the multicore processor and adjusting execution of the second software application based on the detected contention for the another shared resource of the multicore processor.

In a second general aspect, a computer-implemented method for managing contention to separate cores of a multicore processor includes receiving a first indicator of a number of cache misses to a cache memory of a multicore processor for a first software application over a first time period. The first software application executes on a first core of the multicore processor and a second software application executes on a second core of the multicore processor during the first time period, and the first core and the second core share the cache memory of the multicore processor. The method also includes receiving a second indicator of a number of cache misses to the cache memory of the multicore processor for the second software application over the first time period. The method further includes determining a degree of contention between the first software application and the second software application based on the first indicator and the second indicator, and based on the determined degree of contention: (i) preventing the second software application from accessing the cache memory shared by the first core and the second core if the degree of contention exceeds a determined contention threshold, or (ii) permitting the second software application to access the cache memory shared by the first core and the second core if the degree of contention does not exceed the determined contention threshold.

In various implementations, receiving the first indicator may include reading from a memory location accessible by the first core and the second core, and receiving the second indicator may include reading a performance counter associated with the second core. The first time period may occur during a first execution of the first software application, and the degree of contention may also be determined during the first execution of the first software application.

In a third general aspect, a computer-implemented method for managing contention between applications concurrently executing on separate cores of a multicore processor includes determining a degree of contention between a first application executing on a first core of a multicore processor and a second application simultaneously executing on a second core of the multicore processor, wherein the first core and the second core share a cache memory of the multicore processor. The method also includes, based on the determined degree of contention: (i) halting execution of the second software application on the second core for a first response period of time if the determined degree of contention exceeds a determined contention threshold, or (ii) enabling execution of the second software application on the second core for a second response period of time if the determined degree of contention does not exceed the determined contention threshold.

In a fourth general aspect, a system includes a processor that includes: a first processing core and a second processing core, the first processing core and the second processing each being configured to execute instructions of software applications, a cache memory that is accessible by the first processing core and by the second processing core, and a first counter configured to count a number of misses to the cache memory by a software application executing on the first processing core, and a second counter configured to count a number of misses to the cache memory by a software application executing on the second processing core. The system also includes computer storage storing instructions for implementing a runtime engine configured to: determine a degree of contention for the cache memory between a first application executing on the first processing core and a second application simultaneously executing on the second processing core by comparing a first number of cache misses provided by the first counter with a second number of cache misses provided by the second counter, and halt execution of the second application on the second processing core for a first determined period of time if the degree of contention exceeds a determined contention threshold, and enable execution of the second application on the second processing core for a second determined period of time if the degree of contention does not exceed the determined contention threshold.

In various implementations, the runtime engine includes a first component runtime engine and a second component runtime engine, where the first component runtime engine may be associated with the first application and the second component runtime engine may be associated with the second application. The runtime engine may execute periodically in response to an interrupt. The first application may be more sensitive to latency than is the second application. The runtime engine may be further configured to halt execution of the second application on the second core for a time period longer than the first response period of time when successively measured degrees of contention between the first application and the second application exceed the determined contention threshold. Each of the first processing core and the second processing core may include a private cache memory, and the cache memory that is accessible by the first processing core and the second processing core may include a last level cache for the first processing core and the second processing core.

The details of one or more implementations are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Cross-core application interference due to contention for shared on-chip and off-chip resources can pose a significant challenge to providing application level quality of service (QoS) guarantees on commodity multicore processor microarchitectures. Cross-core interference can be especially problematic for software applications that are latency-sensitive, such as applications that are expected to respond to an input or query within a short period of time, such as a few milliseconds or tens of milliseconds, for example, and where an undue delay in response may displease a user. Examples of latency-sensitive applications may include web search, image search, e-mail applications, mapping applications, or other user-facing applications commonly found in web service data center application domains.

In contrast to latency-sensitive applications, so-called "batch" software applications may not generally include low-latency execution requirements, and may instead tend to be throughput-oriented. Examples of batch applications may include various compression applications, encoding applications, backup applications, or other applications that are not actively responsive to user service requests. Batch applications may nevertheless contend for shared resources with co-located applications executing in parallel on a multicore processor under various circumstances.

Modern multicore processors can include one or more private (unshared) cache memories for each core of the multicore processor, and a larger shared cache memory that may generally be used by any of the cores of the processor (or by applications, threads, or processes executing on the cores). One example multicore processor includes two cores, where each core includes a private L1 memory cache for exclusive use by the respective core. The processor also includes a larger (4 Mb in this example) L2 memory cache that is shared by the two cores, where either core may generally access the shared cache at any time under conventional operation. One or both cores may use the shared cache, for example, when a working set for an application executing on the core is too large to fit within the core's private L1 cache. Another example multicore processor architecture includes four cores, each having private L1 and L2 caches for dedicated use by the respective core, and a single shared L3 cache (8 Mb in this example) that may be used by any of the four cores. Multicore processors having 8 cores or 12 cores are also commercially available.

Figure 1:
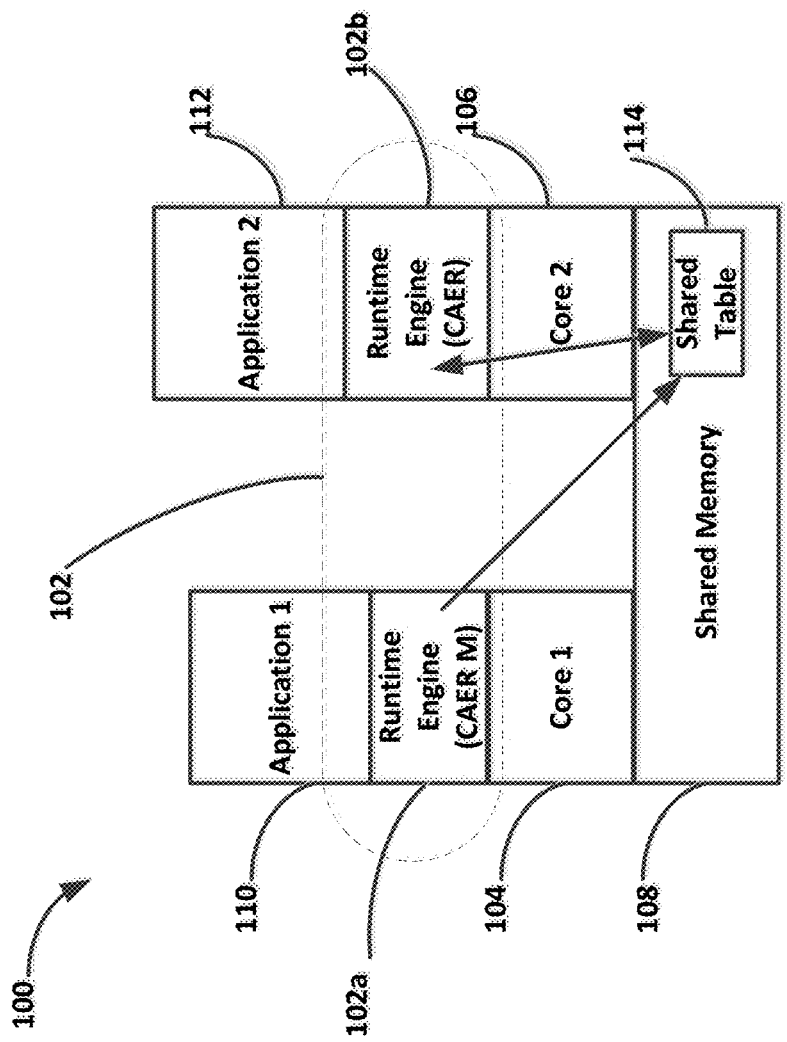
FIG. 1 is a conceptual diagram of an example execution environment that includes an example runtime engine executing on a multicore processor.

FIG. 1 is a conceptual diagram of an example execution environment 100 that includes an example runtime engine 102 executing on a multicore processor. In this example, the multicore processor includes a first core 104, a second core 106, and a shared memory cache 108 that may generally be accessed by either the first core 104 or the second core 106. Without limitation, first core 104 and second core 106 may each include functional units and logic for decoding and executing instructions, register files, reservation stations, performance counters that monitor hardware performance within the core, and one or more levels of private cache memory (e.g., L1 cache, or L1 cache and L2 cache). The cores 104 and 106 of the multicore processor may be substantially identical in some implementations, such as including a common set of the features described above. In various implementations, threads or processes of separate applications, or of the same application, may simultaneously execute on the first core 104 and on the second core 106 of the multicore processor.

The environment 100 shows that a first application 110 and a second application 112 are co-located on the multicore processor, with the first application 110 executing on the first core 104 and the second application 112 executing on the second core 106. In an implementation, the first application 110 may be more latency sensitive than the second application 112. For example, the first application 110 may be a latency-sensitive application, such as web search, and the second application 112 may be a non-latency-sensitive batch application, such as a compression application. First application 110 or second application 112 may alternatively be threads or processes of an application or applications, in various implementations.

In various implementations, the runtime engine 102 provides a run-time solution that detects contention or cross-core interference as it is actually happening between co-located applications, such as the first application 110 and the second application 112, and adjusts execution of a less-latency-sensitive application, if appropriate. In this manner, contention on a commodity multicore processor may be detected as it occurs using a software solution, and steps to minimize contention may be taken in response to detection of contention. Because the runtime engine 102 detects contention online—that is, as the contention is occurring—between co-located applications, the runtime engine 102 may be better able to avoid false positive contention predictions that can be common with conventional systems that attempt to merely predict when contention will occur based on historical characteristics of applications. Additionally, the runtime engine may provide a dynamic solution that detects contention between co-located, executing applications rather than a static analysis that merely attempts to predict future contention based on historical behavioral data or profiling data. As will be discussed further below, runtime engine 102 may include component runtime engines, and the determination that contention is occurring, as well as any response to the contention, may in various implementations be performed by a single component runtime engine of runtime engine 102, by two or more of the component runtime engines, by a subset of the component runtime engines, or by all of the component runtime engines.

Referring again to FIG. 1, runtime engine 102 includes a first runtime engine 102a and a second runtime engine 102b. The first runtime engine 102a is shown running on the first core 104, and the second runtime engine 102b is shown running on the second core 106, in this example. The runtime engines 102a, 102b, or "runtimes," may comprise code that runs on, or is executed by, a respective core, in addition to the previously described applications 110 and 112. In some examples, one or more of the runtime engines 102a, 102b may be a process. In some examples, one or more of the runtime engines 102a, 102b may be a system daemon. In some examples, one or more of the runtime engines 102a, 102b may be linked as a shared library file. The number of runtimes in execution environment 100 is not limited to what is shown in FIG. 1. For processor architectures having a different number of processing cores than what is shown in FIG. 1, the runtime engine 102 may include a corresponding number of component runtime engines 102a, 102b, . . . , each of which may run on a particular core of the multicore processor. The runtime engines may provide a dedicated software solution to shared resource contention and may provide reaction thereto. The runtime engines may be used with off-the-shelf commodity multicore processors to minimize contention and maximize core utilization, according to some implementations.

In various implementations, one or more of the runtime engines 102a, 102b may be interrupt driven. In one example, all of the runtime engines are interrupt driven. For example, code associated with the runtime engines 102a and 102b may respectively execute following receipt of an interrupt by the corresponding core. The interrupt may occur periodically, such as about once per millisecond in one example. In other examples, the interrupt frequency may be any appropriate value, such as about every 500 microseconds, 800 microseconds, 1.2 milliseconds, 1.5 milliseconds, 2 milliseconds, or the like. The interrupts to the respective cores 104, 106 may be synchronized in some implementations. Upon occurrence of an interrupt at a processing core, the core may temporarily halt execution of the application (e.g., application 110 or application 112) loaded on the core, execute the runtime engine code, and then resume execution of the application. In various examples, the runtime engine may use an empirical method to detect when two or more applications are contending for shared resources (e.g., a last level cache), and may stagger, pause, or shutter execution of a less important application to permit a more important application to execute with less contention.

As will be described below, the runtime engine 102 provides a low-overhead run-time solution that minimizes cross-core interference due to contention for shared resources, while maximizing utilization of the processor cores. In various implementations, the runtime engine 102 (e.g., engine 102b) detects actual contention between co-located applications, threads, or processes, and responds to detected contention by throttling back execution of a less-latency-sensitive application (e.g., application 112) so that a more-latency-sensitive application (e.g., application 110) may prospectively see less contention. With reference to FIG. 1, the runtime engine 102 (e.g., engine 102b) may thereafter periodically check for contention among the applications 110 and 112, and may adjust execution of application 112 accordingly. For example, if the runtime engine 102 (e.g., engine 102b) continues to detect contention, the runtime engine may more aggressively scale back execution of application 112 in a continuing effort to reduce contention. If the runtime engine 102 (e.g., engine 102b) determines that contention has abated, the runtime engine 102 may allow application 112 to resume execution.

The runtime engine 102 may be described as a Contention Aware Execution Runtime (CAER) engine that provides a computationally light-weight runtime solution. In the example shown in FIG. 1, the engine 102 includes an instance of a first runtime engine 102a, labeled "CAER M," and an instance of a second runtime engine 102b, labeled "CAER." The CAER M engine 102a may be a monitoring engine, and is associated with the first core 104, on which the first (latency-sensitive) application 110 is executing in this example. The CAER engine 102b may be a contention-detection-and-reaction engine, and is associated with the second core 106, on which the second (non-latency-sensitive) application 112 is executing. The runtime engines 102a, 102b may represent virtual layers beneath the application threads running on the particular cores of the multicore processor. In various implementations, the virtual layers may be cooperative and share information. The virtual layers may additionally respond or adapt to each other, according to some implementations. The functions of the CAER M engine 102a and the CAER engine 102b will be discussed in greater detail below.

Figure 2:
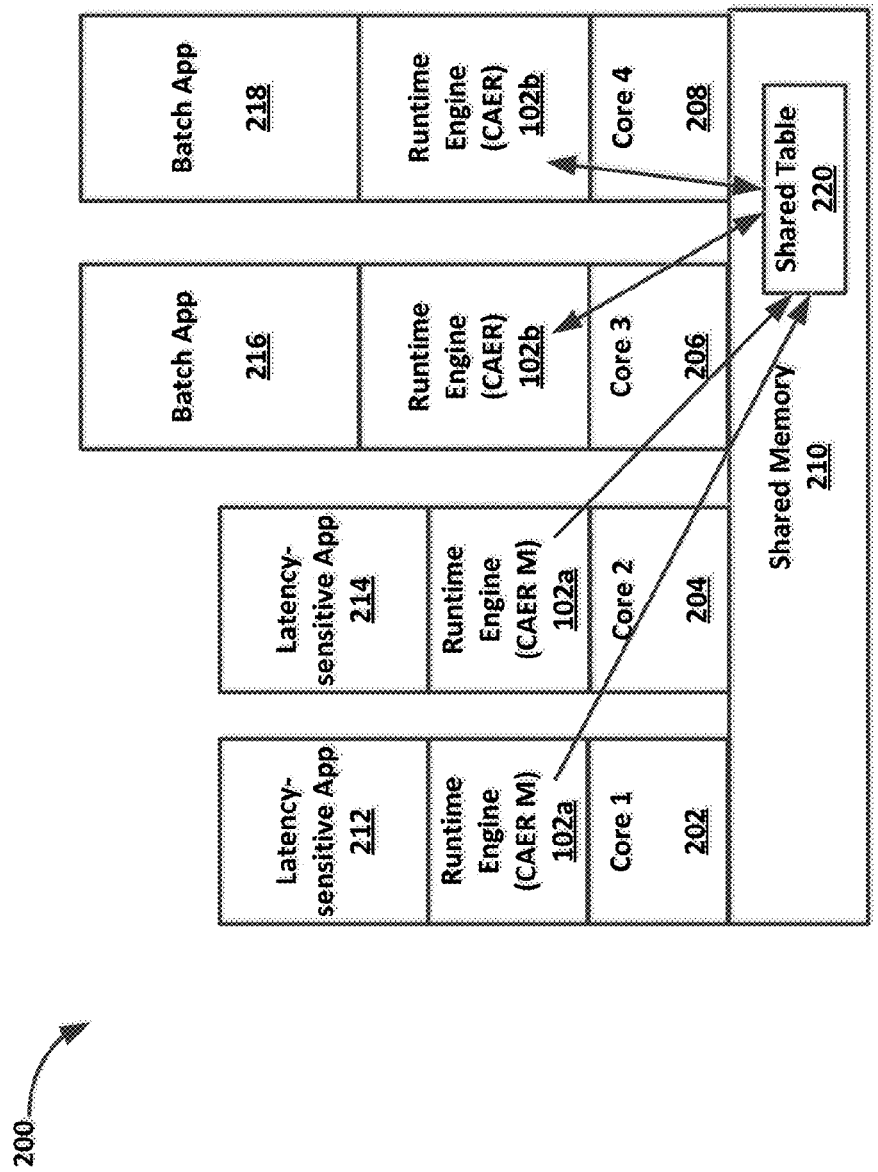
FIG. 2 is a conceptual diagram of another example execution environment that includes an example runtime engine executing on a multicore processor.

FIG. 2 is a conceptual diagram of another example execution environment 200 that includes an example runtime engine 102 executing on a multicore processor. In this example, the multicore processor includes four cores, 202, 204, 206, and 208, and a shared memory 210 that is generally shared between the four cores 202, 204, 206, and 208. Environment 200 shows two latency sensitive applications 212 and 214 that respectively execute on the first core 202 and the second core 204, and two batch applications 216 and 218 that respectively execute on the third core 206 and the fourth core 208. Each of the cores 202, 204, 206, and 208 of the multicore processor may include a common set of features or functional units, in some implementations.

Monitoring runtime engines (CAER M) 102a are shown associated with the cores 202, 204 on which the latency-sensitive applications 212 and 214 are located, and contention-detection-and-response runtime engines 102b are shown associated with the cores 206, 208 on which the non-latency-sensitive batch applications 216 and 218 are located.

In some implementations, the code for the runtime engines (e.g., the runtime engines 102a and 102b of FIG. 1 and FIG. 2) may initially be stored in a non-volatile storage location (e.g., a disk) of the system in which the multicore processor operates. The code for the runtime engines may be stored in a shared library file, for example, and may be linked in as a shared library so that it may be executed by an individual core (e.g., a CPU on the core). In some examples, the runtime engines (i.e., runtimes) 102 may be statically linked into the binary.

Referring again to FIG. 1 and as described above, the first application 110 and the second application 112 are co-located on the multicore processor. Co-located applications, processes, or threads may place varying amounts of demand on shared resources, such as the shared memory cache 108, or other shared resources (not shown) such as the bus, front-side bus (if applicable), memory controller, main memory, disk, other I/O devices, network interface card, or network, among others. This demand can often lead to contention for these resources, and such contention can directly impact application performance.

When a working set of an application process or thread executing on an individual core fits neatly into the private cache of the core, so that the working set does not spill over into the shared cache 108, there may be no cross-core interference (assuming coherence traffic is at a minimum, for example). However, when the size of an application's working set exceeds the size of the private cache, the working set can spill over into the shared cache 108. In some implementations, the shared (e.g., last-level) cache 108 presents the first level of possible contention. For example, when more than one application is using the shared cache 108, and the data is not shared, contention can occur. This contention can be especially problematic if one application (e.g., application 112) causes data from another application (e.g., application 110) to be flushed from the shared cache 108, so that such data is not readily available in the shared cache 108 when application 110 needs it. Contention can also exist later in the memory subsystem, such as contention on the bus, in the memory controller, for higher-level shared memory, disk, at a network interface card, on a network, and the like. However, much of the contention in these levels is manifested as off-chip traffic, and thus may be reflected as last-level-cache misses on the chip. The runtime engine 102 may monitor activity in the shared cache (which may be the last level of cache) to detect contention.

In various implementations, the techniques described herein may also be used in detecting contention on these other types of shared resources, and when contention is detected execution of a software application may be adjusted.

Figure 3:
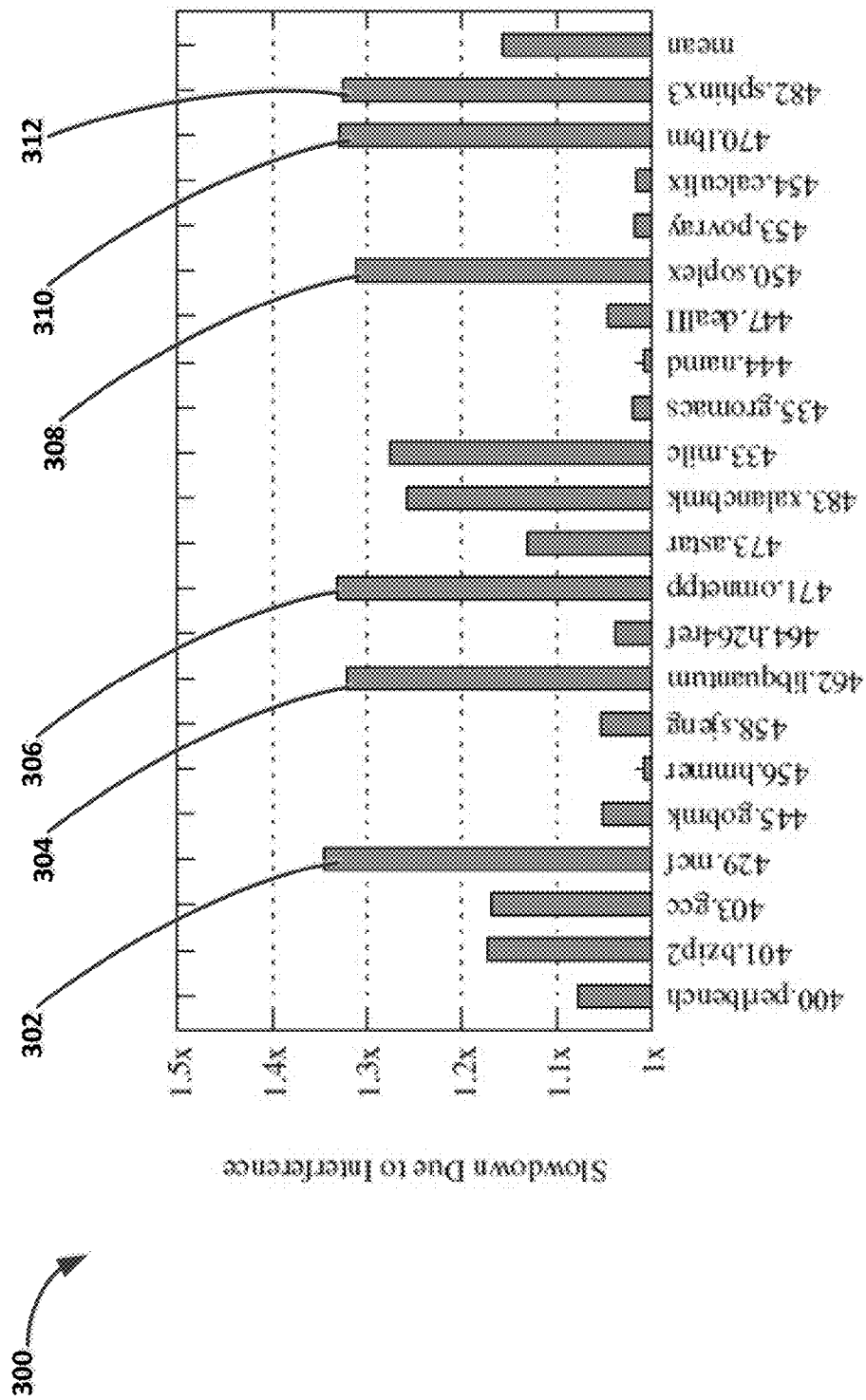
FIG. 3 is a bar graph that quantitatively illustrates examples of performance degradation caused by contention for shared resources.

FIG. 3 is a bar graph 300 that quantitatively illustrates performance degradation caused by cache contention. FIG. 3 shows the results of an experiment performed using a modern quad-core processor, where various benchmark programs from Standard Performance Evaluation Corporation (SPEC) CPU2006 benchmark suite (SPEC2006) were initially executed alone on the quad-core chip, and were then separately co-located with the "lbm" benchmark application from the SPEC2006 suite. The bars in FIG. 3 show the slowdown of the various programs when co-located with the lbm application, which executed on a neighboring core of the processor. Lbm is an example of an application with aggressive cache usage, and the slowdown results are due to contention among the applications for last level cache resources. Slowdowns exceeding 30% can be seen in a number of examples. For example, bars 302, 304, 306, 308, 310, and 312 are each associated with benchmark applications whose execution was slowed by more than 30% due to cross-core interference when co-located with the lbm application.

Figure 4A:
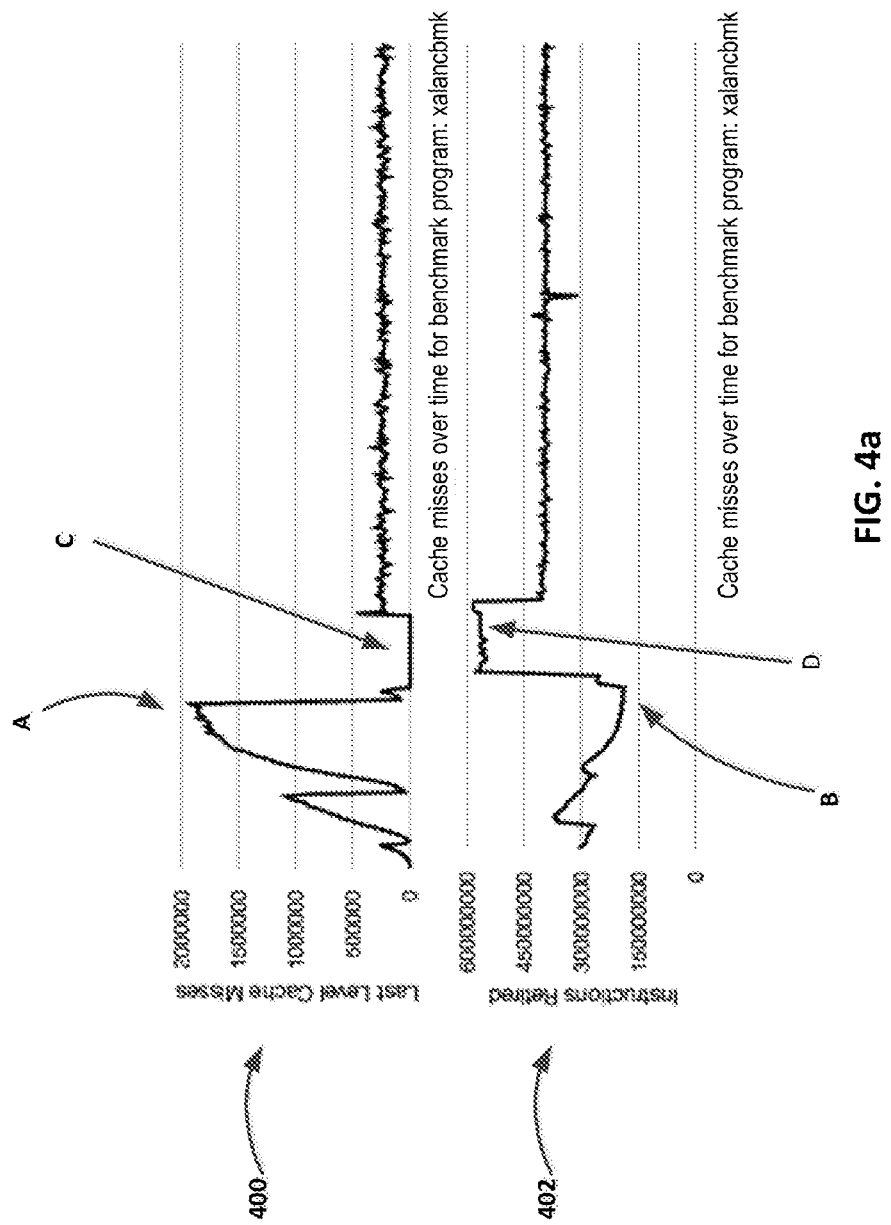
FIG. 4a is a pair of graphs that show how last level cache misses correlate to a reduced instruction retirement rate for an example benchmark program.

FIG. 4a is a pair of graphs 400 and 402 that show how last level cache misses directly correlate to a reduced instruction retirement rate for an example benchmark program. Cache misses occur when an application attempts to access information from the cache but is not able to, either because the data is not located in the cache (read miss) or because the cache is full or not able to be written without flushing data from the cache (write miss). Examples of cache misses can include a "cold miss," where the referenced memory address's bits have no entry in the cache; a "capacity miss," where the cache is full, and some or all portions of information in the cache need to be evicted before new information can be added to the cache; a "conflict miss," where there are too many memory objects with the same cache-addressing bits in the cache competing for the same lines and exceeding the cache's associativity; or a "coherence miss." A write miss can occur, for example, in cases where an allocate on write policy is used for the cache. In cases where the cache is being shared between two or more applications or cores, one application's flushing or deleting data from the cache may adversely impact the other application's ability to execute optimally.

The horizontal axis represents time for each of graphs 400 and 402, and the graphs 400, 402 share a common time axis scale. The vertical axis of graph 400 represents last level cache misses, and the vertical axis of graph 402 represents a number of instructions retired. As can be seen when viewing graphs 400 and 402 together, during periods where cache misses are at high levels, such as the period indicated by arrow A, the corresponding number of instructions retired is relatively low (see arrow B). Similarly, when the number of cache misses is low or zero, such as the period indicated by arrow C, the corresponding number of instructions retired is relatively high (see arrow D).

Figure 4B:
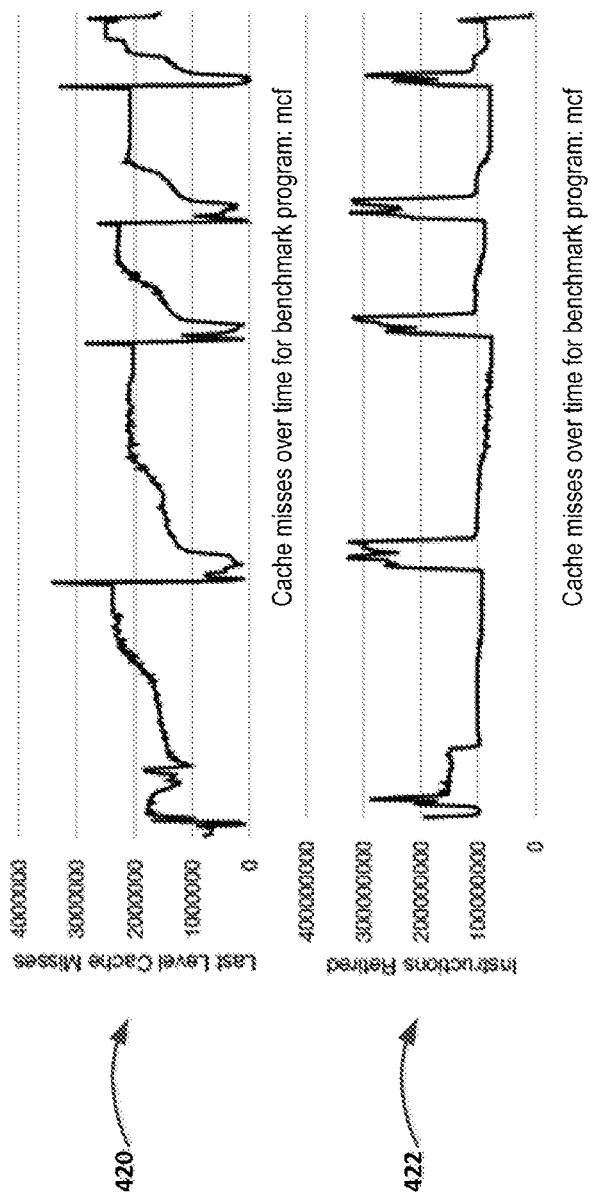
FIG. 4b is another pair of graphs that show how last level cache misses correlate to a reduced instruction retirement rate for another example benchmark program.

FIG. 4b is another pair of graphs 420, 422 that show how last level cache misses directly correlate to a reduced instruction retirement rate for another example benchmark program. Similar to the graphs 400 and 402 of FIG. 4a, the graphs 420 and 422 clearly show the inverse relationship between the number of last level cache misses and instruction retirement rate.

Modern multicore processors can include, within or associated with each processing core of the multicore processor, various hardware-performance monitors that can provide real-time micro-architectural information relating to the application currently running on the core. In some implementations, these monitors are counters that increment in response to occurrences of particular actions or inactions. Cache misses are one example of an occurrence that can be tracked by performance counters of modern processors. These monitors or counters generally do not impede execution of the application program.

Referring again to FIG. 1, a shared table 114 is shown residing in shared memory 108. FIG. 2 similarly shows a shared table 220 residing in shared memory 210. In various implementations, the shared table 114 or 200 resides in shared virtual memory, and may be accessed by any of the cores. The discussion that follows will be presented with reference to FIG. 1 for simplicity, but a similar discussion may also apply to the environment 200 of FIG. 2. The shared table may permit cooperation between the runtime engines 102a, 102b. In various implementations, runtime engine 102a may read one or more performance counters or monitors associated with the first core 104, and may copy the value or an associated value to the shared table 114. In some implementations, the runtime engine 102a may use a software application programming interface (API), such as the Performance API (PAPI) or the Perfmon API, to read one or more performance monitors or counters.

As can be seen in FIG. 1, the CAER M runtime engine (or virtual layer) 102a is thinner than the CAER runtime engine (or virtual layer) 102b, which may indicate that the CAER M runtime engine is streamlined as compared to the CAER runtime engine 102b (i.e., lighter weight). In some examples, the CAER M engine 102a collects performance data for the application 110 or core 104, such as data indicative of last level cache misses, and places the data in the shared table 114. In some examples, runtime engine 102a writes a value indicative of a number of cache misses experienced by application 110 running on the first core 104 over a predetermined period of time to the shared table 114. The number of cache misses may represent a number of last level cache misses, for example (such as misses to cache 108, e.g.).

The CAER runtime engine (or virtual layer) 102b that lies beneath the throughput-oriented batch application 112 may read the information from the shared table 114. Engine 102b may also optionally read or receive performance information concerning application 112 or the second core 106, and may optionally write the information to the shared table 114. In some examples, engine 102b processes the information to perform contention detection and response heuristics. If the CAER runtime engine 102b detects contention between application 110 and application 112, it may apply dynamic adaption or modification to the batch application 112. In various implementations, only execution of the less-latency-sensitive application (e.g., application 112 in this example) may be staggered or paused in response to contention, and the more-latency-sensitive application (application 110 here) may be allowed to execute without modification.

The runtime engine 102 may employ a periodic probing approach to gather and analyze data. The approach may be interrupt-driven, and performance counters may be read and restarted following each interrupt. In one implementation, each runtime engine probes the relevant performance monitoring units and reports last level cache information to the communication table 114 or 220. The table is thus used to record a window of sample points, so that trends of several samples may be observed. With reference to FIG. 2, each of the runtime engines 102a, 102b may write performance values to the shared table 220.

The main CAER engines 102b that lie under the batch processes detect and react to contention. In some implementations, the main CAER engines 102b cause a coordinated reaction among the batch processes/threads. In some implementations, reaction directives may also be recorded in the table 114 or 220, and runtime engines 102b may force all batch processes to adhere to the reaction directives. Reaction directives can include pausing and staggering execution, for example.

Figure 5:
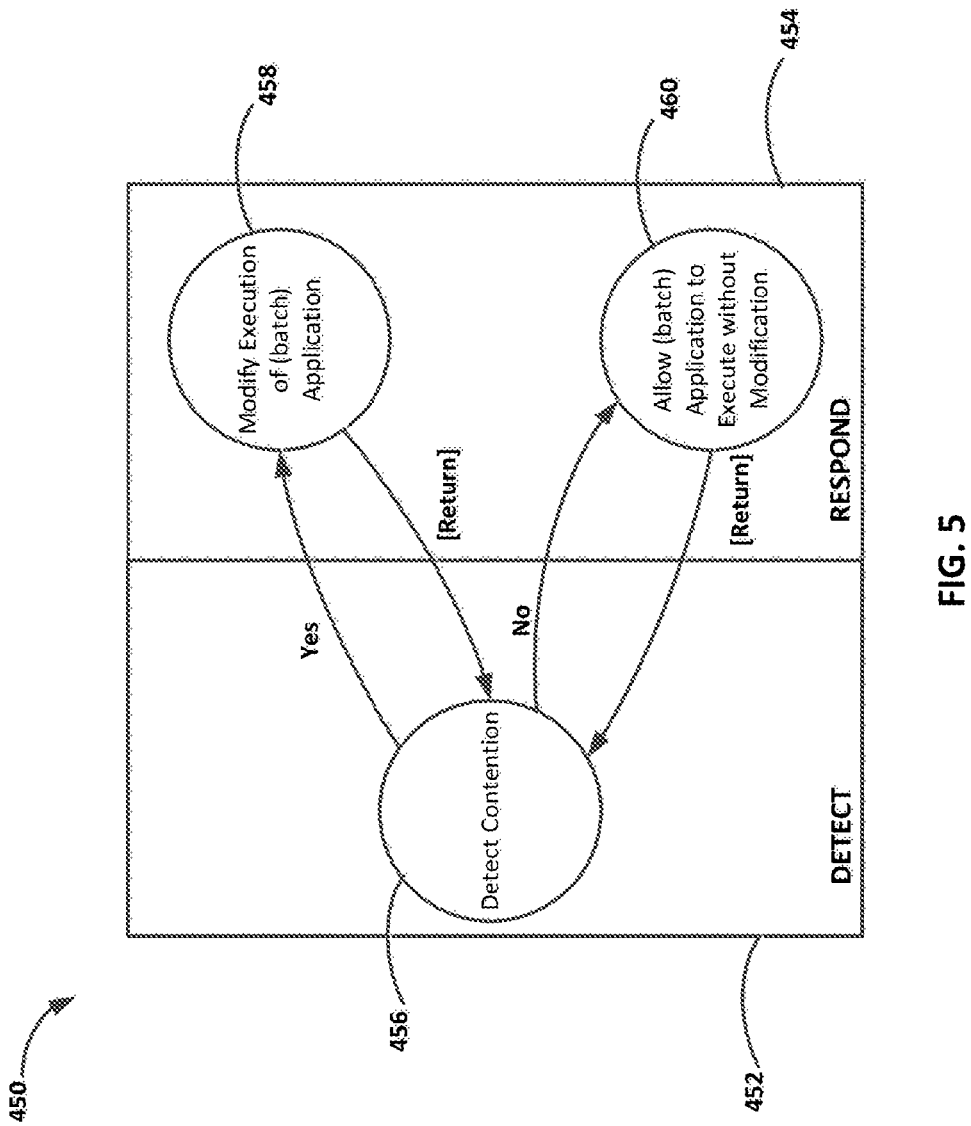
FIG. 5 is an example of a state diagram that may be implemented by a runtime engine.

FIG. 5 is an example state diagram 450 that may be implemented by a runtime engine 102b. The state diagram generally includes two phases: a detection phase 452, where contention or the absence of contention is detected, and a response phase 454, where execution of a batch application may be modified. The detection phase 452 includes a single "Detect Contention" state 456, and the response phase 454 includes a "Modify Execution of (batch) Application" state 458 and an "Allow (batch) Application to Execute without Modification" state 460. Throughout execution, the runtime engine 102b may reside in one of these states 456, 458, 460, and may transition between the states. The particular states will be discussed in more detail below, but as can be seen with reference to FIG. 5, after the runtime engine 102b performs its contention detection heuristic, the runtime engine 102b transitions to the modify state 458 if contention is detected and transitions to the no modify state 460 if an absence (or a tolerated amount) of contention is detected. From state 458, the runtime engine 102b transitions to the detect contention state 456 after it responds to the detected contention. From state 460, the runtime engine 102b transitions to the detect contention state 456 after it responds to the detected lack of contention.

Figure 6:
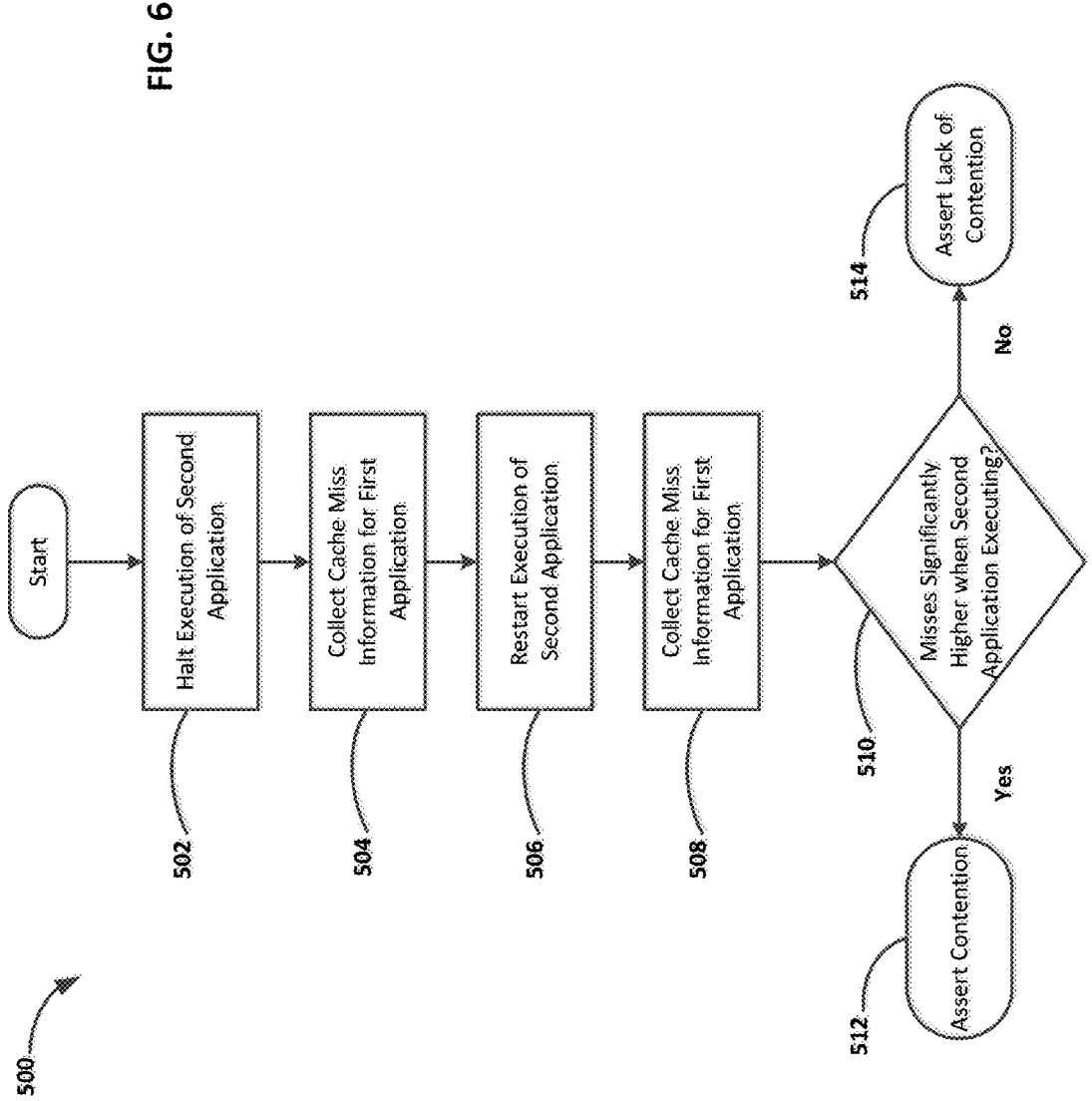
FIG. 6 is a flowchart of examples of operations that may be executed by a runtime engine to detect contention for shared resources among applications.

FIG. 6 is a flowchart 500 of example operations that may be executed by a runtime engine to detect contention for shared resources among applications. The operations may be executed, for example, to detect contention between co-located applications on a multicore processor. The discussion assumes that a first application is executing on a first core, and a second application is executing on a second core. Execution of the second application is halted (502), and cache miss information is collected for the first application (504). The cache miss information may correspond to shared cache (e.g., last-level-cache) miss information, and this information may be indicative of how the first application performs when the second application is paused. For example, the first application may be spared from competing with the second application during the period where the second application is halted. In some implementations, samples of the cache miss information for the first application are collected over a number of periods, and an average of the samples is computed. In some implementations, a runtime engine 102a may read a cache miss performance counter and write the corresponding value to the shared table 114, and the runtime engine 102b may read the value from the shared table 114. In some implementations, the runtime engine 102a may write several values to the shared table 114, and the runtime engine 102b may read the values from the shared table 114.

Execution of the second application may be restarted (506), and cache miss information may be collected for the first application (508). The cache miss information may correspond to last-level-cache miss information, and this information may be indicative of how the first application performs when the second application is executing. For example, if the first application and the second application both use the shared cache, the first application may compete with the second application for use of the shared cache, which may result in cross-core application interference. If this occurs, cache miss rates for the first application may be higher during periods when the second application is executing. In some implementations, samples of the cache miss information for the first application are collected over a number of periods, and an average of the samples is computed. In some implementations, a runtime engine 102a may read a cache miss performance counter and write the corresponding value to the shared table 114, and the runtime engine 102b may read the value from the shared table 114. In some implementations, the runtime engine 102a may write several values to the shared table 114, and the runtime engine 102b may read the values from the shared table 114.

If the number of first-application cache misses corresponding to the period where the second application is executing is significantly higher than the number of first-application cache misses corresponding to the period where the second application is halted (510), contention may be asserted (512). Otherwise, a lack of contention is asserted (514), which may occur when the number of first-application cache misses is not higher or is only marginally higher when the second application is executing as compared to when the second application is halted. In some implementations, runtime engine 102b may compare the corresponding values and make the contention determination.

This contention detection heuristic may be referred to as a shutter-burst approach, because cache misses for the first application are separately observed during periods when a co-located application is halted or shuttered, and when the co-located application is executed (or executed in a burst mode). A runtime engine (e.g., runtime engine 102b) may determine whether two co-located applications are contending by comparing performance of a latency-sensitive application during periods of inactivity and burst activity of a co-located application. The method may be executed, for example, while the runtime engine is operating in the detect contention state 456 (FIG. 5), for example. For a batch application that is contentious with a co-located latency-sensitive application, the runtime engine 102b may see a spike in last-level cache misses of the latency-sensitive application during periods where the batch application has a burst of execution, as compared to periods where the batch application is paused or halted.

A number of parameters of the shutter-burst contention detection approach may be adjusted or tuned. In various examples, the parameters may be tuned to meet QoS requirements of the application. In some implementations, the runtime engine may dynamically adjust parameters based on behavior or performance of the applications under test. This may permit the runtime engine to dynamically adapt. For example, the number of periods or length of time that the batch application is halted may be adjusted. Also, the number of periods or length of time that the batch application is executed during the burst portion of the approach may be adjusted. Additionally, the runtime engine may adjust or vary the threshold difference (or impact threshold) that it uses to determine whether contention is occurring (e.g., the number of additional cache misses seen during execution of the second application as compared to the number of misses seen while the second application is halted). For example, the impact threshold determines how much cross-core interference the latency application is willing to withstand, and may be adjusted to provide a "knob" that can be intuitively used to set the amount of impact needed to trigger an assertion of contention. In some examples, threshold differences may be percentage differences, such as 3%, 5%, 7%, 10%, 20%, 30%, 40%, or the like. In some cases, threshold differences may be a difference in cache miss counts for a particular monitoring period.

With reference again to FIG. 5, the runtime engine may transition to a Modify Execution of (batch) Application state 458 when contention is detected. In some implementations, the runtime engine may halt execution of the batch application for a fixed number of periods or a fixed period of time (e.g., 5 ms, 10 ms, 15 ms, 20 ms, or any appropriate period of time) when contention is detected (that is, while in state 458). In some implementations, the runtime engine may halt execution of the batch application for an adaptive number of periods when contention is detected (that is, while in state 458). For example, when contention is observed in successive periods, or if contention is consistently being detected, the runtime engine may halt execution of the batch application for a longer period of time (e.g., for a longer number of periods or a longer period of time). For example, if a previous response halted execution of the batch application for a certain period of time (e.g., 10 ms), and contention persists, the batch application may thereafter be halted for twice as long (e.g., 20 ms). As described above, when a lack of contention is detected, the runtime engine may permit the batch application to execute without limitation (e.g., while in state 460).

The forgoing response approach may be referred to as a red-light, green-light approach. When contention among co-located applications is detected, a red light is applied to the less-latency-sensitive application, and when a lack of contention among the applications is detected, a green light is applied to the less-latency-sensitive application.

The runtime engine may cause execution of a software application to be adjusted in various ways. For example, in some implementations, the runtime engine may ask an operating system to prevent the software application from executing for a period of time or to command the software application to halt for a period of time. In examples where the runtime engine is linked to the application, the application may request to enter a sleep mode for a period of time based on the runtime engine's determination of contention, according to various implementations.

Figure 7:
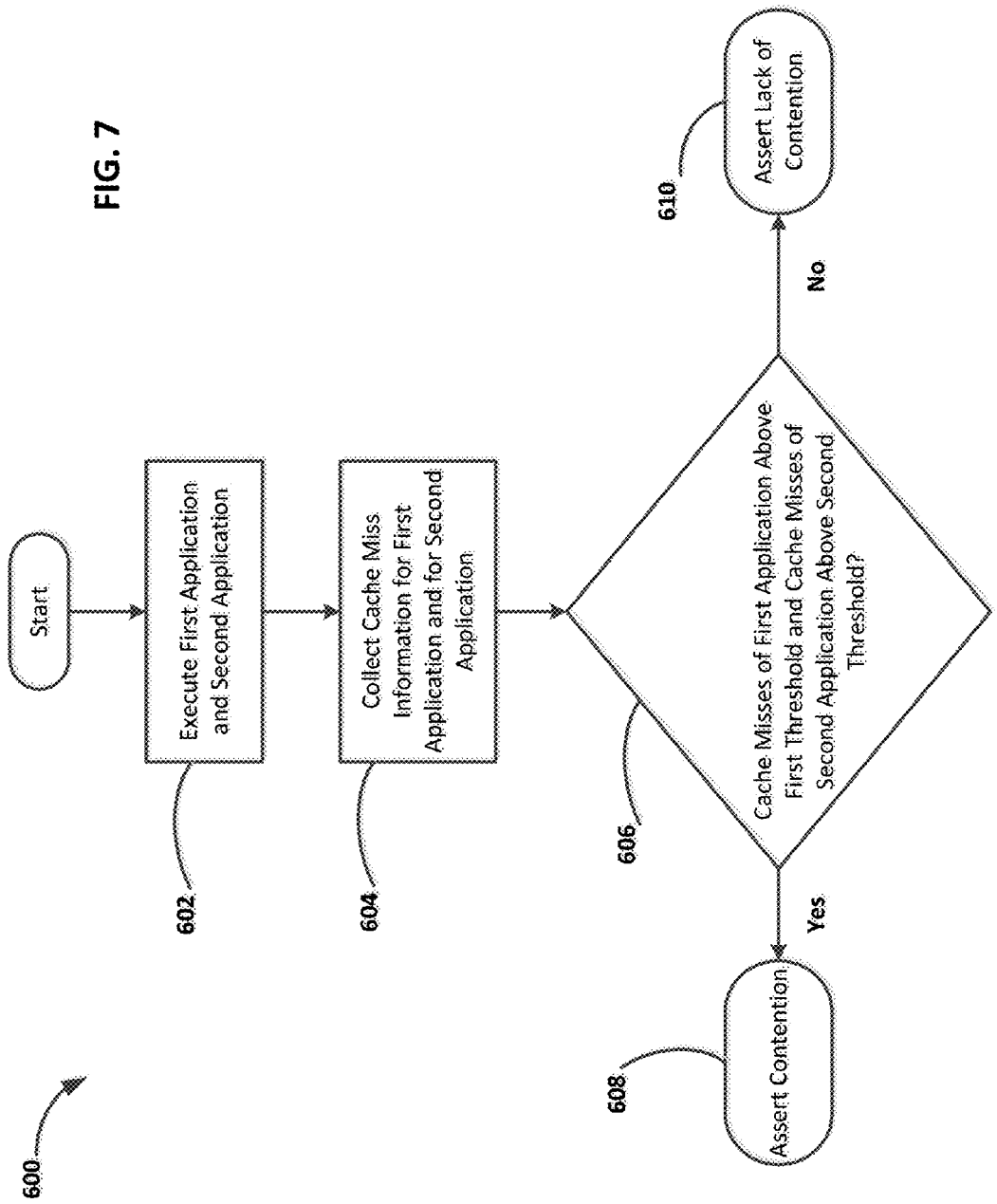
FIG. 7 is another flowchart of operations that may be executed by a runtime engine to detect contention for shared resources among applications.

FIG. 7 is another flowchart 600 of example operations that may be executed by a runtime engine to detect contention for shared resources among applications. The operations may be executed, for example, to detect contention between co-located applications on a multicore processor. A first application and a second application are allowed to execute (602), and cache miss information for the first application and for the second application is collected (604). The cache miss information may be shared cache (e.g., last-level cache) miss information, for example, and may represent the number of cache misses for the first application and the second application, respectively, during a period of time when both the first application and the second application are executing on separate cores of a multicore processor.

In some implementations, a runtime engine 102a may read a cache miss performance counter for the first application and write the corresponding value to the shared table 114, and the runtime engine 102b may read a cache miss performance counter for the second application, and may optionally write the corresponding value to the shared table 114. In some implementations, the runtime engines may write several values to the shared table 114.

If the number of cache misses for the first application is above a first threshold value, and if the number of cache misses for the second application is above a second threshold value (606), contention may be asserted (608). This may occur, for example, when both applications making heavy usage of the shared cache and evicting each other's data from the cache. One example of a threshold value may be 1500 for a monitoring period of 1 ms, for example, but this value may be varied as appropriate. In some examples, the same threshold value may be used in monitoring each application, while in other implementations different threshold values may be used. If either of the cache miss values does not exceed the corresponding threshold, a lack of contention may be asserted (610). For example, if the latency-sensitive application is not heavily incurring cache misses, it is probably not suffering from cache contention, and similarly if the batch application is not heavily incurring cache misses, it is probably not using or at least not contending in the cache very much.

In some examples, running averages of last-level cache-miss windows for both the latency-sensitive application and the batch application are maintained. When the average for either application rises above a particular threshold, where the threshold may be a common threshold for both applications or separate thresholds, contention may be asserted. One example of a threshold may be 1500 misses over a 1 ms period, for example. By contrast, when the average for either application dips below the corresponding threshold, a lack of contention may be asserted.

The FIG. 7 contention detection heuristic may be referred to as a rule-based approach. A runtime engine (e.g., runtime engine 102b) may perform the rule-based contention detection heuristic, for example, while the runtime engine is operating in the detect contention state 456 (FIG. 5), for example. The runtime engine may adjust or vary a number of parameters of the rule-based approach. For example, the size of the window may be varied, and the one or more thresholds used for determining whether the applications are missing heavily can be adjusted. Examples, of durations over which misses may be monitored can include durations less than a millisecond (500 microseconds, 800 microseconds, e.g.), or durations of about one millisecond, a few milliseconds (e.g., 2 ms, 5 ms, 8 ms, or the like), or tens of milliseconds (e.g., 10 ms, 15 ms, 20 ms, 30 ms, 50 ms, 70 ms, or the like). These durations may apply to either the shutter-burst detection approach or to the rule-based detection approach.

With reference again to FIG. 5, the runtime engine may transition to a Modify Execution of (batch) Application state 458 when contention is detected. In some implementations, the runtime engine may apply a soft lock on the shared cache (e.g., while in state 458, see FIG. 5) to prevent the cache from being used by applications other than the latency-sensitive application until the cache is no longer being used heavily by the latency-sensitive application. The batch application may be allowed to fully resume execution when the pressure on the cache subsides (e.g., when in state 460, see FIG. 5). The forgoing response approach may be referred to as a soft-locking approach.

In some implementations, the runtime engine may use the shutter-burst approach to detect contention and may use the red-light, green-light approach to respond to contention (or lack of contention). In alternative implementations, the runtime engine may use the shutter-burst approach to detect contention and may use the soft-locking approach to respond to contention (or lack of contention).

In some implementations, the runtime engine may use the rule-based approach to detect contention and may use the red-light, green-light approach to respond to contention (or lack of contention). In alternative implementations, the runtime engine may use the ruled-based approach to detect contention and may use the soft-locking approach to respond to contention (or lack of contention).

Classification of an application as either a latency-sensitive application or a non-latency-sensitive (e.g., batch) application may be done in various ways. In some examples, the runtime engine may classify the applications. In some examples, an administrator may classify the applications, such as when the applications are deployed. In some examples, the classification of an application may be changed.

Advantages of the approaches discussed herein can include reducing cross-core application interference seen by latency-sensitive applications, which may improve an instruction retirement rate of the latency-sensitive application. Also, core utilization may be improved over conventional solutions that avoid co-locating latency-sensitive applications with batch locations on a multicore chip. This can provide substantial cost savings in various settings. For example, in a data center application where hundreds, thousands, or tens of thousands of multicore processors may be used to perform tasks associated with the data centers, a core utilization improvement of 30%, 20%, 10%, or even 1% may mean millions of dollars in saved expense. Work may additionally get done faster as a result of improved utilization. Power may be conserved, for example, if the processor may enter a lower power mode during periods of inactivity because scheduled tasks may have completed faster. Power may additionally be conserved when fewer processors are needed to perform a given set of work because of improved core utilization.

In various examples, the techniques described herein may be used in data center server applications. The techniques may also be used in consumer devices, such as desktop or laptop computers, tablets, personal digital assistants, smartphones, cell phones, set-top boxes, portable music players, portable electronic reading devices, and the like.

Figure 8:
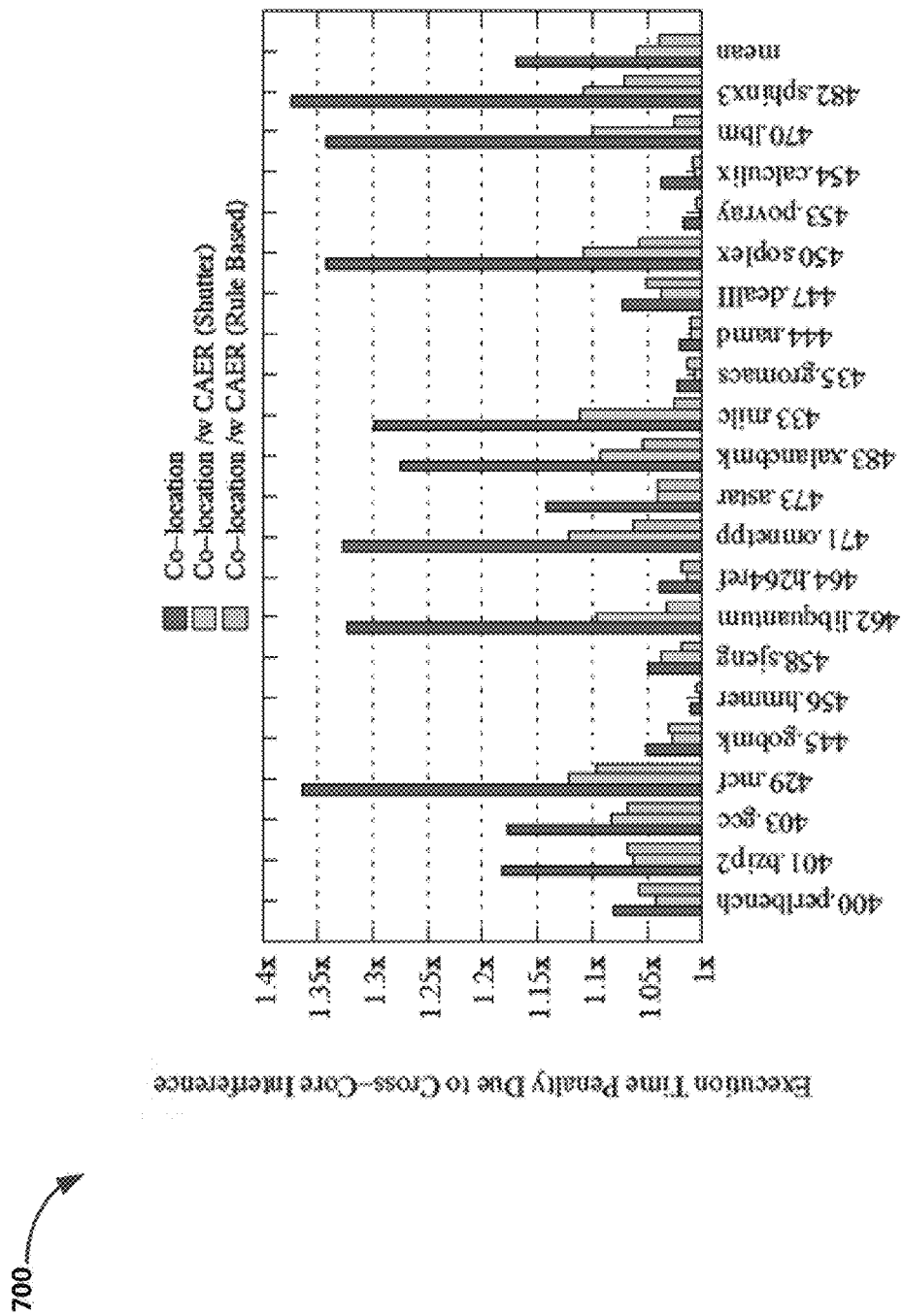
FIG. 8 is a bar chart that shows example results of an experiment using methods described herein to reduce a cross-core interference penalty associated with co-located applications on a multicore processor.

FIG. 8 is a bar chart 700 that shows example results of an experiment using methods described herein to reduce a cross-core interference penalty associated with co-located applications on a multicore processor. Various programs from the SPEC2006 benchmark (C/C++ only) suite were co-located with the lbm benchmark, which served as a batch application for testing. The various programs were considered the latency-sensitive program during the experiment. All programs were run to completion using their reference inputs. An Intel® Core i7 (Nehalem) 920 Quad Core architecture was used to perform the experiment. SPEC runs were scripted to launch the latency-sensitive application shortly after the batch was launched. In the few cases where the lbm (batch) benchmark completed before the latency-sensitive application, the latency-sensitive application was automatically and immediately relaunched, and the logs for the executions were aggregated.

For each of the applications listed along the horizontal axis in chart 700, three bars are shown. The vertical axis of chart 700 shows the execution time penalty due to cross-core interference for the various configurations, versus the latency-sensitive application executing alone. The first bars show the cross-core interference penalty when co-locating the native applications directly on the multicore chip and letting the applications simultaneously execute. The second bars show the cross-core interference penalty when co-locating the native applications and using the CAER runtime engines with the shutter-burst contention detection heuristic. The last bars show the results for co-location using the CAER runtime engines with the rule-based contention detection approach.

As can be seen in FIG. 8, the cross-core interference penalty is significantly reduced when using the CAER runtime engines for the wide range of SPEC2006 benchmarks. For the experiment, the burst shutter contention detection technique was paired with the red-light green-light response approach, with a response length of 10 periods. An impact threshold of 5% was used for the shutter-burst contention detection method, so that if the batch application burst caused a spike of 5% or more in last level cache misses of the latency-sensitive application, the runtime engine would assert contention. On average, use of the CAER runtime engines implementing the shutter-burst and red-light, green-light approaches resulted in a reduction of overhead due to contention from 17% down to 6%, and resulted in nearly a 60% gain in processor utilization, as can be seen in FIG. 9, described below.

For the experiment, the rule-based contention detection technique was paired with the soft-locking response approach, with the usage threshold set to 1500. Heavy usage of the cache was declared if an average of 1500 or more last level cache misses per period (1 ms) was observed. On average, use of the CAER runtime engines implementing the rule-based contention detection and soft-locking response approaches resulted in a reduction of overhead due to contention from 17% down to 4%, and resulted in a 58% gain in processor utilization, as can be seen in FIG. 9, described below.

Figure 9:
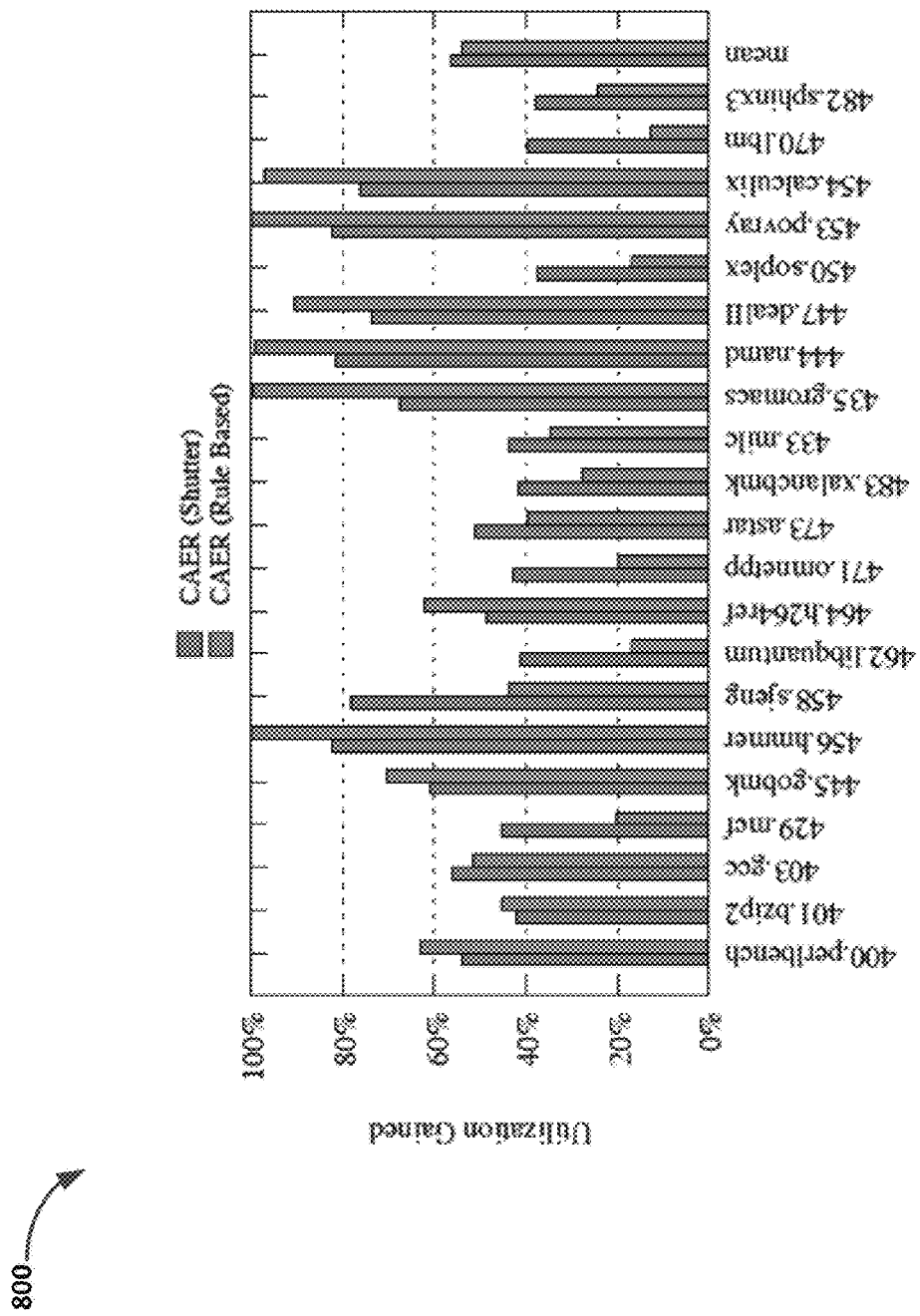
FIG. 9 is a bar chart that shows example results of the experiment described with reference to FIG. 8 as related to improved core utilization.

FIG. 9 is a bar chart 800 that shows example results of the experiment described with reference to FIG. 8 as related to improved core utilization. In seeking an optimal strategy, tradeoffs may be considered. For example, running the latency-sensitive application alone may completely eliminate cross-core interference, but will result in 0% utilization gained. Running the applications together may result in 100% utilization gained, but may provide 0% cross-core interference elimination. Using the runtime engines discussed herein, an optimal solution of reduced cross-core application interference combined with improved core utilization may be achieved.

In various examples, an amount of performance impact an application can experience due to contention for shared resources can differ from application to application. For a given application, this may be referred to as its cross-core interference sensitivity. This characteristic can also be determined by the amount of reliance an application puts on a shared resource. Applications whose working set fits in its core-specific private cache(s) may be cross-core interference insensitive. Applications whose working set uses shared cache, memory, or other shared resources may be cross-core interference sensitive.

In various implementations, the runtime engines discussed herein may handle contention detection and response differently for cross-core interference insensitive applications as compared to cross-core interference sensitive applications. For example, an amount of utilization that is sacrificed to reduce contention for a cross-core interference sensitive application may be higher than for a cross-core interference insensitive application. As an example, if application A is 50% slower when experiencing contention with application X, while application B is only 4% slower when contending with application X, then application A is more cross-core interference sensitive than application B, and the runtime engines may be more willing to sacrifice utilization to eliminate contention that application A sees to reduce the cross-core interference penalty. The runtime engines may accordingly adjust parameters of the approaches discussed herein to achieve these goals.

Figure 10:
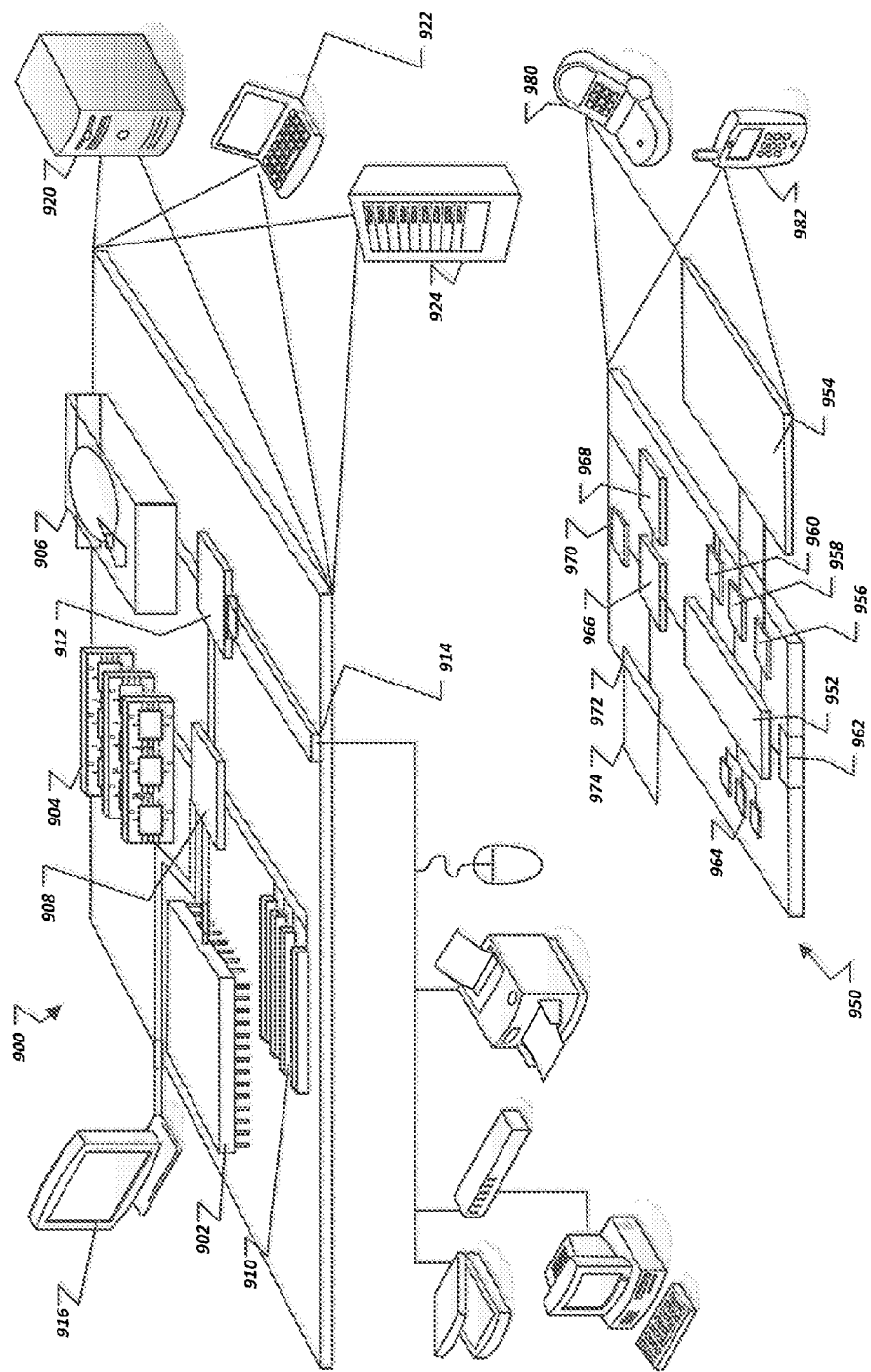
FIG. 10 is a block diagram of example computing devices that may be used to implement the systems and methods consistent with this disclosure.

FIG. 10 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be example only, and are not meant to limit implementations described and/or claimed in this document.

Computing device 900 includes a multicore processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. Each core of the multicore processor 902 can process instructions for execution within the computing device 900, including instructions stored in the memory 904 or on the storage device 906 to display graphical information for a GUI on an external input/output device, such as display 916 coupled to high speed interface 908. In other implementations, multiple multicore (or single core) processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In various implementations, such servers 920 or rack server systems 924 may be used in large data centers, for example. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a multicore processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

Each core of the multicore processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for cache contention handling, the method comprising:

concurrently executing a first software application on a first core of a multicore processor and a second software application on a different, second core of the multicore processor, the first core and the second core sharing a cache memory of the multicore processor, wherein the first core is arranged to access the shared cache memory when a private cache memory of the first core is unavailable, wherein the second core is arranged to access the shared cache memory when a private cache memory of the second core is unavailable;

identifying that a first number of cache misses by the first software application to the shared cache memory occurred over a first time period during the concurrent execution of the first software application and the second software application on the first core and the second core of the multicore processor, respectively;

identifying that a second number of cache misses by the second software application to the shared cache memory occurred over the first time period;

determining, based on the first number of cache misses by the first software application and the second number of cache misses by the second software application to the shared cache memory over the first time period, that a degree of contention for the shared cache memory among the first software application and the second software application during the first time period exceeds a threshold degree of contention;

accessing data that indicates execution of the first software application on the multicore processor is to be prioritized over execution of the second software application on the multicore processor so as to minimize latency in responding to user inputs directed to the first software application; and in response to determining that the degree of contention for the shared cache memory during the first time period exceeds the threshold degree of contention, adjusting continued execution of the second software application on the second core so as to reduce the degree of contention for the shared cache memory among the first software application and the second software application, wherein the second software application is chosen for adjusted execution rather than the first software application based on the data that indicates execution of the first software application is to be prioritized over execution of the second software application.

2. The computer-implemented method of claim 1, wherein adjusting continued execution of the second software application on the second core so as to reduce the degree of contention for the shared cache memory comprises temporarily halting execution of the second software application for a period of time, and resuming execution of the second software application when the period of time is passed.

3. The computer-implemented method of claim 2, further comprising:

monitoring the degree of contention for the shared cache memory during the period of time in which execution of the second software application is temporality halted; and determining when to resume execution of the second software application based on one or more indications of degrees of contention for the shared cache memory at different times during the period of time in which execution of the second software application is temporarily halted.

4. The computer-implemented method of claim 1, wherein adjusting continued execution of the second software application on the second core so as to reduce the degree of contention for the shared cache memory comprises preventing the second software application from accessing the shared cache memory for a period of time during which the first software application continues to execute on the first core and the second software application continues to execute on the second core.

5. The computer-implemented method of claim 4, wherein the second software application is prevented from accessing the shared cache memory until the degree of contention for the shared cache memory among the first software application and the second software application is determined to no longer exceed the threshold degree of contention.

6. The computer-implemented method of claim 1, wherein identifying that the first number of cache misses by the first software application to the shared cache memory occurred over the first period of time comprises accessing an indicator of the first number of cache misses, the indicator being is stored at a shared memory location that is accessible to both the first core of the multicore processor and the second core of the multicore processor.

7. The computer-implemented method of claim 1, further comprising determining a degree of contention for one or more additional shared resources of the multicore processor among the first software application and the second software application,
    wherein the one or more additional shared resources are selected from a group comprising a bus, a memory controller, an input-output device, and a network interface device,
    wherein a manner in which the continued execution of the second software application on the second core is adjusted is further based on the determined degree of contention for the one or more additional shared resources of the multicore processor.

8. The computer-implemented method of claim 1, wherein the degree of contention for the shared cache memory is determined by a runtime engine that executes on at least one of the first and second cores of the multicore processor at periodic intervals during interrupts of the concurrent execution of at least one of the first software application and the second software application.

9. A computing system including a multicore processor that is adapted for cache contention handling, the computing system configured to perform operations comprising:
    concurrently executing a first software application on a first core of the multicore processor and a second software application on a different, second core of the multicore processor, the first core and the second core sharing a cache memory of the multicore processor, wherein the first core is arranged to access the shared cache memory when a private cache memory of the first core is unavailable, wherein the second core is arranged to access the shared cache memory when a private cache memory of the second core is unavailable;
    identifying that a first number of cache misses by the first software application to the shared cache memory occurred over a first time period during the concurrent execution of the first software application and the second software application on the first core and the second core of the multicore processor, respectively;
    identifying that a second number of cache misses by the second software application to the shared cache memory occurred over the first time period;
    determining, based on the first number of cache misses by the first software application and the second number of cache misses by the second software application to the shared cache memory over the first time period, that a degree of contention for the shared cache memory among the first software application and the second software application during the first time period exceeds a threshold degree of contention;
    accessing data that indicates execution of the first software application on the multicore processor is to be prioritized over execution of the second software application on the multicore processor so as to minimize latency in responding to user inputs directed to the first software application; and
    in response to determining that the degree of contention for the shared cache memory during the first time period exceeds the threshold degree of contention, adjusting continued execution of the second software application on the second core so as to reduce the degree of contention for the shared cache memory among the first software application and the second software application, wherein the second software application is chosen for adjusted execution rather than the first software application based on the data that indicates execution of the first software application is to be prioritized over execution of the second software application.

10. The computing system of claim 9, wherein adjusting continued execution of the second software application on the second core so as to reduce the degree of contention for the shared cache memory comprises temporarily halting execution of the second software application for a period of time, and resuming execution of the second software application when the period of time is passed.

11. The computing system of claim 10, wherein the operations further comprise:
    monitoring the degree of contention for the shared cache memory during the period of time in which execution of the second software application is temporality halted; and
    determining when to resume execution of the second software application based on one or more indications of degrees of contention for the shared cache memory at different times during the period of time in which execution of the second software application is temporarily halted.

12. The computing system of claim 9, wherein adjusting continued execution of the second software application on the second core so as to reduce the degree of contention for the shared cache memory comprises preventing the second software application from accessing the shared cache memory for a period of time during which the first software application continues to execute on the first core and the second software application continues to execute on the second core.

13. The computing system of claim 12, wherein the second software application is prevented from accessing the shared cache memory until the degree of contention for the shared cache memory among the first software application and the second software application is determined to no longer exceed the threshold degree of contention.

14. The computing system of claim 9, wherein identifying that the first number of cache misses by the first software application to the shared cache memory occurred over the first period of time comprises accessing an indicator of the first number of cache misses, the indicator being stored at a shared memory location that is accessible to both the first core of the multicore processor and the second core of the multicore processor.

15. The computing system of claim 9, wherein the operations further comprise determining a degree of contention for one or more additional shared resources of the multicore processor among the first software application and the second software application,
- wherein the one or more additional shared resources are selected from a group comprising a bus, a memory controller, an input-output device, and a network interface device,
- wherein a manner in which the continued execution of the second software application on the second core is adjusted is further based on the determined degree of contention for the one or more additional shared resources of the multicore processor.

16. The computing system of claim 9, wherein the degree of contention for the shared cache memory is determined by a runtime engine that executes on at least one of the first and second cores of the multicore processor at periodic intervals during interrupts of the concurrent execution of at least one of the first software application and the second software application.

17. One or more non-transitory computer-readable media having instructions stored thereon that, when executed by one or more computers, cause performance of operations comprising:
- concurrently executing a first software application on a first core of a multicore processor and a second software application on a different, second core of the multicore processor, the first core and the second core sharing a cache memory of the multicore processor, wherein the first core is arranged to access the shared cache memory when a private cache memory of the first core is unavailable, wherein the second core is arranged to access the shared cache memory when a private cache memory of the second core is unavailable;
- identifying that a first number of cache misses by the first software application to the shared cache memory occurred over a first time period during the concurrent execution of the first software application and the second software application on the first core and the second core of the multicore processor, respectively;
- identifying that a second number of cache misses by the second software application to the shared cache memory occurred over the first time period;
- determining, based on the first number of cache misses by the first software application and the second number of cache misses by the second software application to the shared cache memory over the first time period, that a degree of contention for the shared cache memory among the first software application and the second software application during the first time period exceeds a threshold degree of contention;
- accessing data that indicates execution of the first software application on the multicore processor is to be prioritized over execution of the second software application on the multicore processor so as to minimize latency in responding to user inputs directed to the first software application; and
- in response to determining that the degree of contention for the shared cache memory during the first time period exceeds the threshold degree of contention, adjusting continued execution of the second software application on the second core so as to reduce the degree of contention for the shared cache memory among the first software application and the second software application, wherein the second software application is chosen for adjusted execution rather than the first software application based on the data that indicates execution of the first software application is to be prioritized over execution of the second software application.

* * * * *